Nov. 19, 1929.  W. WESTBURY ET AL  1,736,026
POT AND KILN CONSTRUCTION
Original Filed May 20, 1924   3 Sheets-Sheet 3

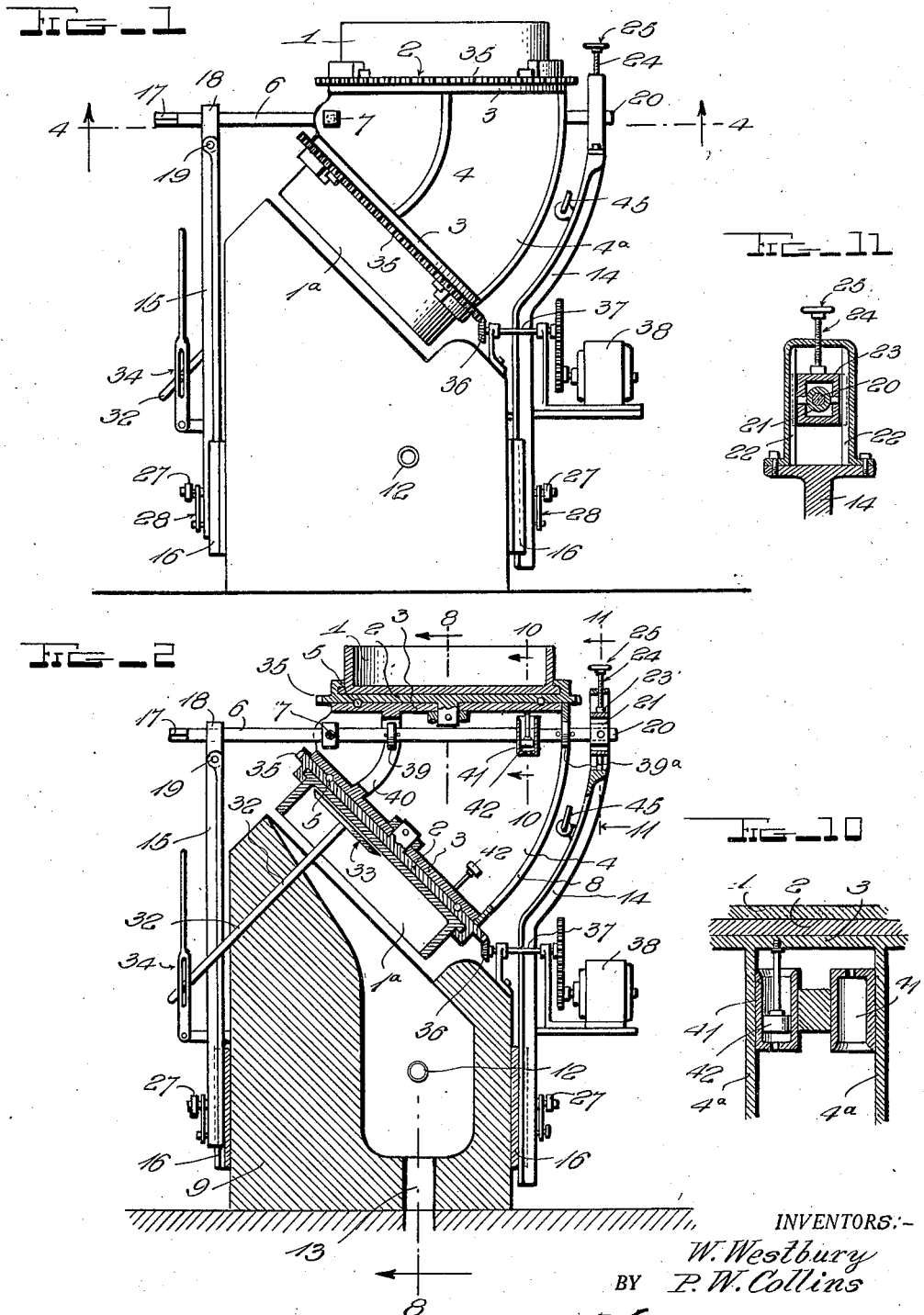

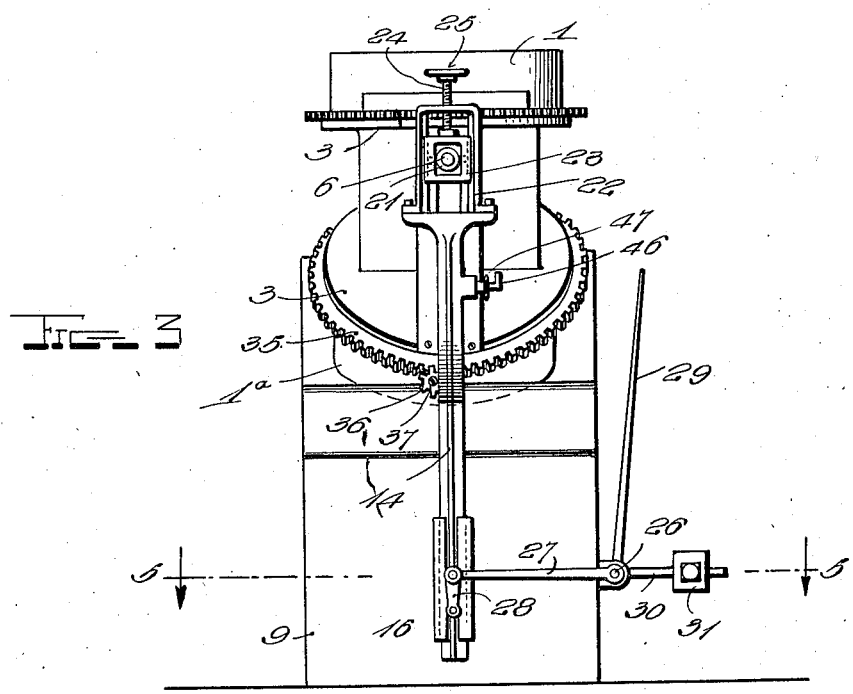
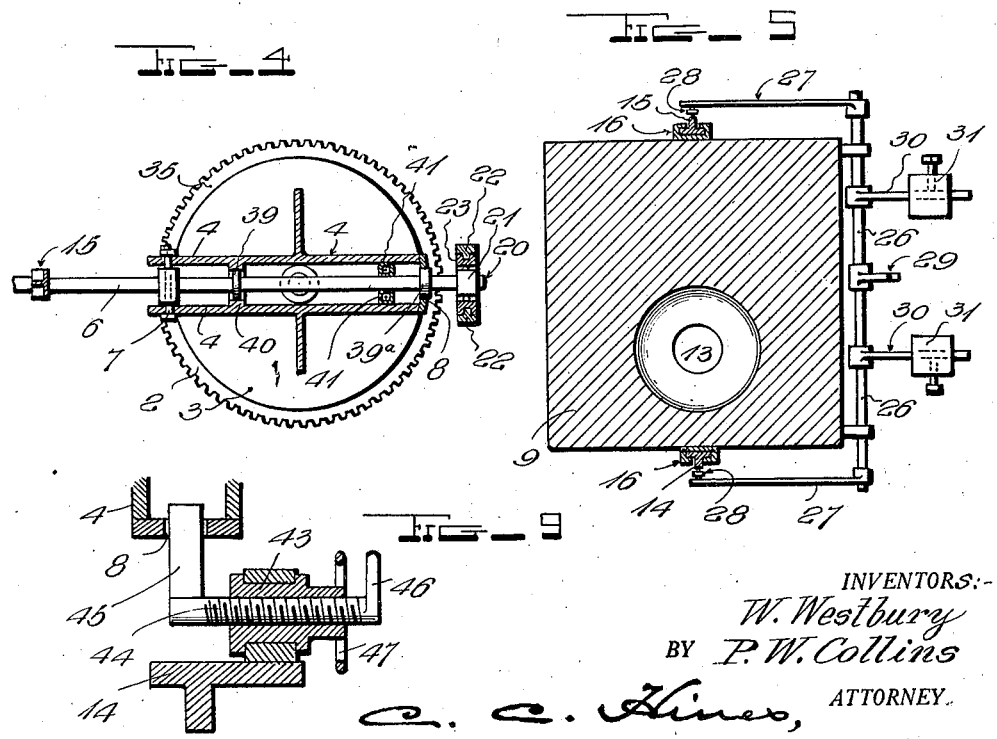

INVENTORS:-
W. Westbury
BY P. W. Collins
C. C. Hines
ATTORNEY.

Patented Nov. 19, 1929

1,736,026

UNITED STATES PATENT OFFICE

WILLIAM WESTBURY AND PATRICK W. COLLINS, OF INDEPENDENCE, KANSAS, ASSIGNORS, BY MESNE ASSIGNMENTS, TO HARDING GLASS COMPANY, OF FORT SMITH, ARKANSAS, A CORPORATION OF WEST VIRGINIA

POT AND KILN CONSTRUCTION

Application filed May 20, 1924, Serial No. 714,680. Renewed January 21, 1926.

This invention relates to pot and kiln constructions, and has particular reference to double reversible glass drawing pots employed in drawing glass cylinders and which are movable alternately between drawing and draining positions and arranged for cooperation with a heating kiln operative for melting the aftermath from either pot when disposed in draining position.

One object of the invention is to provide novel means broadly embodying a rotary reversing shaft and a pot carrying frame pivoted to swing thereon for reversing the positions of two pots for alternately disposing the same in drawing and draining positions.

Another object of our invention is to provide novel means for mounting and reversing the pots whereby, when one pot is in horizontal drawing position, the other or inverted pot will be arranged at an angle between the horizontal and vertical for registry with the mouth of a kiln formed in a correspondingly inclined or sloping kiln wall, allowing ready and convenient movement of the pot to be heated into and out of the kiln mouth.

Still another object of our invention is to provide means for revolving and scraping the inverted pot so as to facilitate the removal of the aftermath and to smooth all portions of and close all crevices in the bottom wall of the pot liable to cause flaws or imperfections in the draw.

Still another object of our invention is to provide simple, reliable and efficient means for reversing the pots whereby the reversing operation may be accomplished in an easy, ready and convenient manner and without liability of injury to attendants or to the parts of the apparatus.

Still another object of our invention is to provide means for adjusting the pot structure in a vertical plane in order that the inverted pot may be moved into the kiln mouth and subsequently elevated out of the kiln mouth for the succeeding reversing motions of the pots; to provide means for locking the pot structure against swinging motion during the progress of a draw and while the inverted pot is being revolved and scraped; to provide means whereby the pots may be tilted so as to correct deficiencies ordinarily resulting in the drawing of a thick and thin cylinder; and to provide means for cushioning the pivotal motions of the pots in their reversing actions in order to avoid objectionable slamming and possible damage to the pots or other parts of the apparatus.

Still another and general object of our invention is to provide a reversible pot structure which may be operated with maximum convenience, ease and speed, and with efficient working results in the production of cylinders which will be to a large degree free from blisters, thick and thin portions or other flaws or imperfections.

With these and other objects in view, the invention consists of the features of construction, combination and arrangement of parts, hereinafter fully described and claimed, reference being had to the accompanying drawings, in which:—

Figure 1 is a side elevation of a pot and kiln structure embodying my invention, showing one of the pots in drawing position and the other pot in draining position.

Figure 2 is a vertical front-to-rear section through the same.

Figure 3 is a front elevation of the same.

Figure 4 is a horizontal section on line 4—4 of Figure 1.

Figure 5 is a similar section on line 5—5 of Figure 3.

Figure 9 is a detail section through the pot locking and adjusting device and a portion of the main pot supporting frame.

Figure 10 is an enlarged detail section taken substantially on line 10—10 of Figure 2.

Figure 11 is a similar section taken on line 11—11 of Figure 2.

Figure 6:
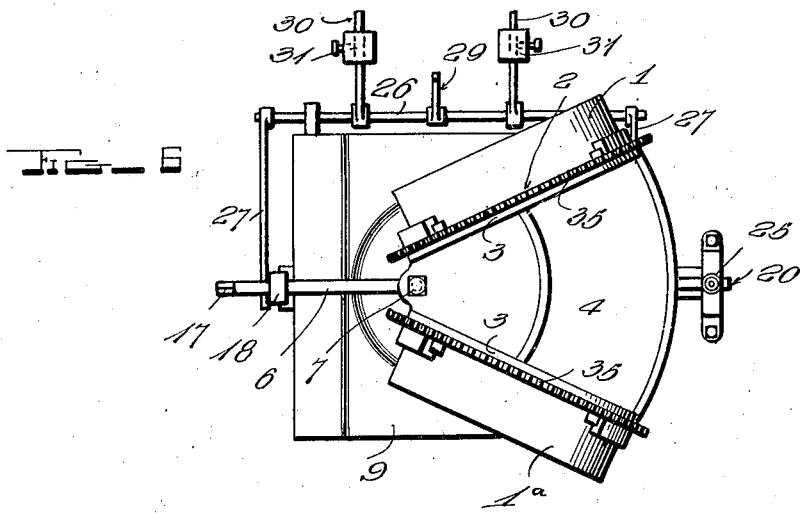
Figure 6 is a top plan view of the device showing the pots in the mid position of their reversing motion.
Figure 7:
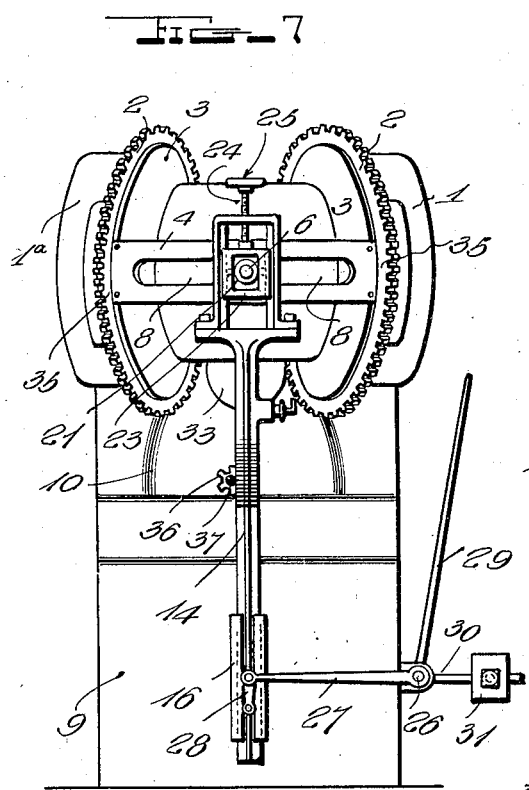
Figure 7 is a front elevation with parts as shown in Figure 6.
Figure 8:
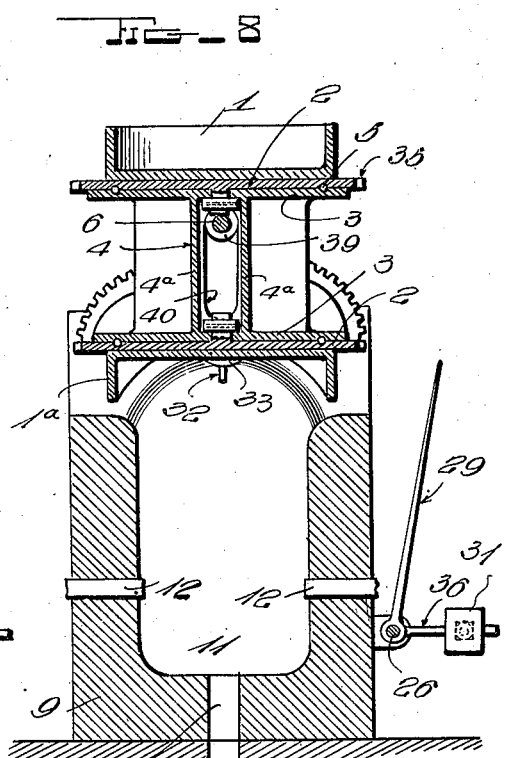
Figure 8 is a section taken substantially on line 8—8 of Figure 2.

Referring now more particularly to the drawings, 1 and 1ª designate a pair of glass drawing pots arranged so as to face generally in opposite directions, each pot being detachably mounted, as usual, or in any ordinary or preferred manner, upon a carrier frame or head 2, allowing ready application of the pots for use and their removal whenever required for repairs or the substitution of new pots. The heads 2 of the respective pots are rotatably mounted upon stationary heads 3 at the opposite ends of a hollow sector-shaped or wedge-shaped body 4, forming a main frame on which both pots are supported. Anti-friction bearings 5 of suitable type may be provided between the surfaces of each pot carrying head 2 and its supporting head 3 in order to permit requisite ease of rotary motion of the pot, for a purpose presently described.

The sector-shaped body 4 is composed of a casting formed of spaced side walls 4ª united by the heads 3. These side walls are spaced a comparatively wide distance apart at the front, where the body extends on the arc of greater radius, and thence converge, like the heads 3, rearwardly and are spaced a comparatively short distance apart at the rear or vertex of the body in the region of the arc of curvature of least radius. A horizontal shaft 6 extends through the body 4 from front to rear thereof, and to this shaft the body is pivotally connected at its vertex portion, as at 7. The pivotal connection 7, which may consist of a pin passing through the shaft 6 and sides of the body 4, fixes the body 4 to the shaft so as to turn with said shaft when the latter is turned, while permitting said body to swing on such pin as an axis in the direction of the general arc of curvature of the body, at right angles to the direction of rotation of the shaft. The arc of curvature of the body 4 is such that when one of the pots, as the pot 1, is in upper horizontal drawing position, the other pot, as the pot 1ª, will be in a lower draining position and disposed at an angle between the vertical and horizontal, preferably at an angle of about 45° to the horizontal plane of the pot 1. By imparting a half revolution to the shaft 6, in one direction or the other, the positions of the pots 1 and 1ª will be reversed, the pot 1 taking the position of the pot 1ª while the latter assumes the position formerly occupied by the pot 1. In this pot reversing action the body 4 swings with the shaft 6 to effect a proper shifting of the positions of the pots, and said body 4 also swings on its pivotal connection by gravity in the reversing action in order that the pot 1ª, which before shifting lies at a greater distance from the shaft than the pot 1, may in the turning operation take the position of the pot 1 with relation to the shaft 6, while the pot 1 assumes the relatively depressed position formerly occupied by the pot 1ª. A guide slot 8 at the front of the body 4 permits of this pivotal motion of the body 4 on the pivot 7 without interference from the shaft.

Arranged below the pot structure is a heating kiln 9 provided with a pot receiving mouth or opening 10, formed in a sloping top wall of the kiln, the slope of the wall corresponding substantially to the inclination of the lower or inverted pot. This mouth 10 communicates with a heating chamber 11 in the kiln body, which chamber is heated by one or more gas burners, generally indicated at 12, and is provided with an outlet 13 at its base for the discharge of the refuse glass. The pot which is inverted and disposed in draining position is received within this mouth 10, so that its interior will be subjected to the heat of the flames from the chamber 11, for the melting out of the aftermath from the pot and the heating of the pot to a proper degree of temperature for the succeeding drawing operation. The inclined arrangement of the inverted pot in the mouth 10 facilitates the drainage of the melted aftermath therefrom by gravity into the kiln chamber 11, as will be readily understood, and the described formation of the kiln also allows of the ready and easy movement of the inverted pot into the kiln and its withdrawal therefrom.

A frame structure is provided for supporting the pot structure and the shaft 6, which frame structure comprises uprights 14 and 15 slidably mounted at their lower ends for vertical adjustment in guides 16 disposed upon the front and rear walls of the kiln. One end 17 of the shaft 6 is journaled in a bearing 18 pivotally mounted on the upright 15, as at 19, while the other end 20 of said shaft is journaled in a bearing 21 vertically movable in the guideway of a guide member 22 suitably formed or provided upon the upright 14. As shown, the bearing 21 is carried by a vertically movable yoke 23 movable in the guideway 22, to which yoke is swiveled the lower end of an adjusting screw 24, mounted in the guide member 22 and provided at its upper end with a hand wheel 25 whereby it may be turned in one direction or the other to raise or lower the yoke 23, and, consequently, the bearing 21. By this means it is evident that the shaft 6 may be tilted on the bearing pivot 19, by adjustment of the screw 24 and the movement of the bearing 21, to adapt the pot which is in drawing position to be tilted in one direction or the other along the line of an imaginary axis arranged at right angles to the shaft 6 for accurate leveling adjustments in such direction. Means are also provided, as hereinafter described, whereby the pot structure may be held from pivotal motion with the shaft 6 during the drawing operation, while permitting of a tilting adjustment of the pot which is in drawing position for leveling operations along an imaginary axial line coincident with the plane of the shaft 6 and at right angles to the imaginary axial line first mentioned, whereby tilting adjustments of the pot in two directions at right angles to each other, for leveling purposes, may be readily and conveniently effected. An operating lever, or any other suitable means, may be applied to the end 17 of the shaft for the purpose of turning the shaft for the pot reversing actions.

Supported at the side of the furnace is a rock shaft 26 provided at its ends with arms 27 pivotally coupled by links 28 to the respective uprights 14 and 15. A lever 29 is fixed to the shaft 26 whereby the shaft may be rocked, and through the connections described, the pot structure bodily lowered and raised for the purpose of moving the lower pot which is to be drained into and out of the kiln mouth. Fixed to the shaft 26 are also arms 30 provided with adjustable counter-weights 31, which are designed to substantially counter-balance the weight of the pot structure, thus permitting it to be raised and lowered with ease and facility.

Slidably mounted upon the kiln is a rod 32 carrying at its inner end a scraper bar 33. This scraper bar 33 is designed, when not in service, to lie against the upper sloping face or top wall of the kiln, and it is adapted to be projected into the bottom pot and brought into engagement with the inner surface of the bottom wall thereof for pot smoothing and scraping actions. The outer end of the rod 32 is suitably coupled to an operating lever 34 or other suitable operating means, whereby the scraper 33 may be projected into working position and withdrawn at the completion of a scraping action. The scraper, which is generally indicated, may be of the water-cooled type and provided with a suitable scraping edge and its connection with the lever or operating device 34 may be such as to adapt the scraper to be held rigidly pressed against the pot bottom with a desired degree of force and without rotation during the scraping operation. The scraper is designed to be projected into bearing contact with the pot which is in draining position after the latter has been heated sufficiently from the kiln to melt the aftermath, the scraper serving in operation to effect the removal of accumulated glass and to smooth the surface of the bottom of the pot so as to close all pits or crevices prior to the use of the pot for the subsequent drawing action. By thus closing all pits and crevices in the pot bottom the retention of air liable to cause blisters or other imperfections in the drawn cylinder will be avoided. The pot is revolved during the scraping action, and for this purpose the rotary pot carrying head 2 is provided with a gear ring 35 of suitable type adapted, when the pot is in depressed position, to engage a gear pinion 36 on a shaft 37 supported at the front of the furnace and operatively driven from an electric or other suitable motor 38. When the pot structure is raised for a reverse action the ring 35 moves out of mesh with the gear 36 in an obvious manner.

In order to ensure an easy motion of the pots on the pivot 7 during the reversing operation, a roller 39 is mounted on the shaft and arranged to be engaged by a track rail 40 disposed upon the interior of the hollow body 4, which track rail lies in bearing contact with the roller 39 and holds the body 4 from lateral or sidewise movement during the turning of the pot structure by and with the shaft 6 and in the swinging movement of said pot structure on the pivot 7. Also a second roller 39ª may be loosely mounted on the shaft to travel along track rails formed by the walls of slot 8, thus additionally supporting and holding the body 4 from any tendency to lateral swing in the reversing action. The rollers and track rails further serve in this connection to reduce slamming of the inverted pot as it is turned over. In order to still further cushion the movements of the pot structure on the pivotal connection 7, suitable cushioning means may be provided. This cushioning means may be in the form of dash pots of any appropriate construction, shown in the present instance as air cushioning cylinders 41 on the shaft adapted to receive plungers or pistons 42 on the heads 3 in the reversing actions, whereby each pot as it is turned over from draining to drawing position will be properly checked in its movement and cushioned, avoiding any liability of injury to operators or damage to the apparatus.

Mounted on the upright 14 is an internally threaded sleeve 43 receiving a threaded shaft 44 carrying at one end a lug or projection 45 and at its other end an operating handle 46. The sleeve 43 is mounted for rotation and against endwise movement on the upright 14 and is provided with a hand wheel 47. The lug 45 normally lies in alinement with the slot 8 in the body 4 and may be moved into and out of engagement with said slot by reverse rotary movements of the sleeve 43. When projected into engagement with the slot 8 the lug 45 will lock the pot structure as a whole rigidly in position against lateral or sidewise movement, which is particularly desirable during the time a draw is made from the upper pot while the lower pot is being revolved for the scraping action, thus preventing any possible movement of the upper pot out of correct drawing position under pressure of the gearing employed to revolve the lower pot. By means of the handle 46, when the projection 45 is engaged with the slot 8, the pot structure as a whole may be swung laterally to a determined degree in either direction on the shaft 6 as an axis for a tilting leveling adjustment of the upper pot on a line at right angles to the tilting leveling adjustment afforded by movement of the pot on the pivotal connection 19 through the adjustment of the hand screw 24. Through the leveling adjustments thus afforded the pot from which the draw is being made, or about to be made, may be tilted in one direction or the other in two planes at right angles to each other for the purpose of disposing it at an absolutely horizontal level or inclined to the horizontal to a proper degree necessary to shift the center of the charge of glass relatively to the center of the cylinder in order to correct any tendency to the drawing of a thick or thin cylinder, arising out of any imperfections in the form of the pot itself, due to warpage or other causes, or any imperfect mounting of the pot on its supports or imperfect mounting of the supports on the kiln structure or to compensate for any other mounting imperfections or adjustments liable to cause drawing of a thick and thin cylinder. When the lug or projection 45 is withdrawn from the slot 8, the body 4 is free to be operated for the pot reversing action, as will be readily understood.

From the foregoing description, taken in connection with the drawings, it will be seen that our invention provides a drawing apparatus employing a two pot structure by means of which when one pot is in drawing position the other pot may be disposed in an inclined position within or above the mouth of a kiln formed in a correspondingly inclined wall of the kiln, so that but a simple adjustment is required to shift a pot from drawing to draining position, in which draining position the pot will be heated for the melting out of the aftermath. It will also be seen that our invention provides simple and effective means whereby the inverted pot may be scraped for the removal of melted glass and to fill all air pocketing pits or crevices in the bottom wall thereof. It will further be seen that our invention provides means whereby the pots may be readily and conveniently reversed in a quick and easy manner and without liability of injury to attendants or damage to the apparatus. Finally, it will be seen that the invention provides simple and effective means whereby the pots may be locked against any shifting of the upper pot out of correct drawing position, and for adjusting the upper pot so as to correct all defects liable to cause thick and thin and other imperfect draws.

No claim is made herein to the new method of manufacture involving the axial turning of the pot during the reheating operation, since the latter is made the subject-matter of a divisional application filed by us on January 21st, 1926, Serial No. 82,879.

Having thus fully described our invention, we claim:—

1. In glass-drawing apparatus, the combination of a rotatable shaft, a frame connected to the shaft, a pair of oppositely facing pots rotatably mounted on the frame on opposite sides of the shaft and arranged at an acute angle to each other, whereby when one pot is in upright horizontal drawing position the other pot will be in inverted inclined draining position, a remelting furnace below the frame having an inclined wall provided with an opening in position to remelt the glass residue in the inverted pot, and means for axially turning the inverted pot.

2. In glass-drawing apparatus, the combination with a pot and means for supporting the pot successively in drawing and draining positions, of means for remelting the glass residue in the pot while the pot is in draining position, and means for axially turning the pot during the remelting operation.

3. In glass-drawing apparatus, the combination with a pot and means for supporting the pot successively in drawing and draining positions, of means for remelting the glass residue in the pot while the pot is in draining position, and means for axially turning the pot, and means for scraping the pot, during the remelting operation.

4. In a glass drawing apparatus, the combination with a kiln having an eye inclined from the horizontal, of a pot carrier having a pair of pots lying at an angle to each other such that one may be in drawing position and the other in the kiln eye, means for shifting said pot carrier to bring the pots alternately to drawing position and to draining position relative to the kiln eye, and means for relatively shifting said draining pot and kiln eye without destroying drawing position of the drawing pot.

In testimony whereof we affix our signatures.

WILLIAM WESTBURY.
PATRICK W. COLLINS.